United States Patent
Matheis et al.

(10) Patent No.: US 10,900,990 B2
(45) Date of Patent: Jan. 26, 2021

(54) ACOUSTIC AIR DATA SENSING SYSTEMS WITH SKIN FRICTION SENSORS

(71) Applicant: Rosemount Aerospace Inc., Burnsville, MN (US)

(72) Inventors: Brian Daniel Matheis, Lakeville, MN (US); Daniel W. Shannon, Glastonbury, CT (US); Sudarshan N. Koushik, West Hartford, CT (US)

(73) Assignee: Rosemount Aerospace Inc., Burnsville, MN (US)

( * ) Notice: Subject to any disclaimer, the term of this patent is extended or adjusted under 35 U.S.C. 154(b) by 31 days.

(21) Appl. No.: 16/361,005

(22) Filed: Mar. 21, 2019

(65) Prior Publication Data

US 2020/0300882 A1    Sep. 24, 2020

(51) Int. Cl.
*G01P 5/02* (2006.01)
*G01P 5/24* (2006.01)

(52) U.S. Cl.
CPC .............. *G01P 5/245* (2013.01); *G01P 5/02* (2013.01)

(58) Field of Classification Search
CPC .................................. G01P 5/245; G01P 5/02
See application file for complete search history.

(56) References Cited

U.S. PATENT DOCUMENTS

| | | |
|---|---|---|
| 3,222,926 A | 12/1965 | Carver |
| 4,112,756 A | 9/1978 | MacLennan et al. |
| 4,143,548 A | 3/1979 | Graewe et al. |
| 4,174,630 A | 11/1979 | Nicoli |
| 4,286,462 A * | 9/1981 | Bourne ................. G01S 15/885 73/170.13 |
| 4,302,827 A * | 11/1981 | Rosenblum ............. G01S 15/88 340/964 |

(Continued)

FOREIGN PATENT DOCUMENTS

| CN | 102218378 B | 2/2013 |
| CN | 204988587 U | 1/2016 |

(Continued)

OTHER PUBLICATIONS

Extended European Search Report for EP Application No. 19211140.9, dated Jun. 16, 2020, pp. 8.

(Continued)

*Primary Examiner* — Jamel E Williams
(74) *Attorney, Agent, or Firm* — Kinney & Lange, P.A.

(57) ABSTRACT

An acoustic air data sensing system includes an acoustic transmitter, a plurality of acoustic receivers, and a skin friction sensor. The acoustic transmitter is located to transmit an acoustic signal into airflow about an exterior of a vehicle. Each of the acoustic receivers is located at a respective angle from a wind angle reference line and a respective distance from the acoustic transmitter. The skin friction sensor is positioned in a boundary layer region of the airflow that interacts with the acoustic receivers and transmitter. Based on time of flight values of the acoustic signal from the transmitter to each of the receivers and a skin friction measurement from the skin friction sensor as inputs to a transformation matrix, the acoustic air data sensing system outputs, from the transformation matrix, the true airspeed, the relative wind angle, and the speed of sound for operational control of the vehicle.

20 Claims, 2 Drawing Sheets

(56) References Cited

U.S. PATENT DOCUMENTS

| | | | |
|---|---|---|---|
| 4,890,488 A | 1/1990 | Pincent et al. | |
| 5,260,702 A * | 11/1993 | Thompson | G01C 5/005 |
| | | | 244/180 |
| 5,343,744 A | 9/1994 | Ammann | |
| 5,783,745 A | 7/1998 | Bergman | |
| 6,390,418 B1 | 5/2002 | McCormick et al. | |
| 6,396,770 B1 * | 5/2002 | Carey | G10K 15/046 |
| | | | 367/141 |
| 6,601,447 B1 | 8/2003 | Loucks | |
| 7,343,793 B2 * | 3/2008 | Tillotson | G01N 29/024 |
| | | | 73/170.01 |
| 8,261,610 B2 | 9/2012 | Choisnet | |
| 9,021,856 B2 * | 5/2015 | Leblond | G01P 21/025 |
| | | | 73/1.29 |
| 9,121,860 B1 * | 9/2015 | Cronyn | G01P 5/245 |
| 9,233,763 B1 * | 1/2016 | Chen | G07C 5/0841 |
| 9,612,252 B2 * | 4/2017 | Waddington | G01P 5/24 |
| 9,964,476 B2 | 5/2018 | White et al. | |
| 10,101,443 B1 * | 10/2018 | LeGrand, III | B64D 43/02 |
| 10,620,231 B2 | 4/2020 | Peters | |
| 10,739,371 B2 | 8/2020 | Ell | |
| 10,746,563 B2 | 8/2020 | Sly et al. | |
| 2007/0107510 A1 * | 5/2007 | Agami | G01K 13/028 |
| | | | 73/182 |
| 2010/0186497 A1 * | 7/2010 | Choisnet | G01P 5/245 |
| | | | 73/170.13 |
| 2010/0276006 A1 | 11/2010 | Bonutti | |
| 2012/0173191 A1 * | 7/2012 | Moeller | G01P 5/22 |
| | | | 702/142 |
| 2013/0301391 A1 | 11/2013 | Altman et al. | |
| 2015/0094976 A1 | 4/2015 | Cooper et al. | |
| 2015/0263762 A1 * | 9/2015 | Shen | H04L 1/0045 |
| | | | 701/3 |
| 2015/0346078 A1 | 12/2015 | Sullivan et al. | |
| 2016/0305977 A1 * | 10/2016 | Genevrier | G01S 7/4813 |
| 2017/0206291 A1 * | 7/2017 | Abramov | G06F 30/20 |
| 2017/0225781 A1 * | 8/2017 | Almasoud | G08G 5/0069 |
| 2017/0291722 A1 * | 10/2017 | Owens | G07C 5/0808 |
| 2017/0356303 A1 * | 12/2017 | Hodge | G01P 5/245 |
| 2018/0164337 A1 * | 6/2018 | Naslund | G01P 5/14 |
| 2018/0354647 A1 * | 12/2018 | North | G07C 5/008 |
| 2018/0356372 A1 * | 12/2018 | Berenbaum | G01N 29/228 |
| 2019/0317122 A1 | 10/2019 | Zhang et al. | |
| 2019/0329859 A1 * | 10/2019 | Bevirt | B64C 29/0033 |
| 2020/0057092 A1 * | 2/2020 | Ell | G01K 11/24 |
| 2020/0110110 A1 * | 4/2020 | Matheis | G01P 21/025 |

FOREIGN PATENT DOCUMENTS

| | | |
|---|---|---|
| CN | 107202746 A | 9/2017 |
| EP | 3567374 A1 | 11/2019 |
| EP | 3633388 A1 | 4/2020 |
| FR | 2974908 A1 | 11/2012 |
| FR | 3027398 A1 | 4/2016 |

OTHER PUBLICATIONS

Extended European Search Report for EP Application No. 19213156.3, dated Jun. 26, 2020, pp. 5.

* cited by examiner

ACOUSTIC AIR DATA SENSING SYSTEMS WITH SKIN FRICTION SENSORS

BACKGROUND

This disclosure relates generally to air data systems, and more particularly to skin friction measurements used in acoustic air data systems.

Certain vehicles, such as aircraft, missiles, high speed ground vehicles, or other vehicles have incorporated air data systems that calculate air data outputs based on measured parameters collected from various sensors positioned about the vehicle. For instance, many aircraft air data systems utilize pneumatic air data probes (e.g., pitot and/or pitot-static probes) that measure pneumatic pressure of oncoming airflow about the aircraft exterior to generate aircraft air data outputs, such as true airspeed, calibrated airspeed, Mach number, altitude, angle of attack, angle of sideslip, or other air data parameters. Traditional angle of attack sensors typically work by aligning a rotating vane with local airflow about the aircraft exterior. The angle of the rotating vane is compared to a reference line of the aircraft, such as a horizontal reference line of the aircraft aligned with, e.g., a chord of a wind of the aircraft, to produce a measured angle of attack.

Traditional pneumatic and rotating vane sensors, however, can be susceptible to failure modes caused by icing and/or particulates within the airflow (e.g., volcanic ash). Ice buildup, for example, can prevent or inhibit rotation of an angle of attack vane, thereby decreasing accuracy of angle of attack measurements. Icing conditions and/or particulate buildup within a pneumatic pitot and/or pitot-static probe can similarly degrade performance of the pneumatic probe to accurately measure pressures of the oncoming airflow, thereby negatively impacting performance of the air data system.

Recent attempts to address the failure modes of traditional air data system sensors include the development of acoustic air data systems. Acoustic air data systems include a plurality of acoustic receivers arranged in an array at known distances and known angles with respect to an acoustic transmitter. Each receiver detects acoustic signals emitted by the transmitter, and the air data system control circuitry produces air data parameters based on time of flight values of the acoustic signal from the transmitter to each receiver and the known relationship between the receivers and the transmitter. However, the boundary layer formed by air flowing over the acoustic transmitter and receiver array tends to deflect acoustic signals away from or toward the vehicle body, attenuating or amplifying the acoustic signal detected by at least some of the receivers. Signal attenuation or signal amplification in varying degrees at each receiver introduces error into the air data parameters outputted by the acoustic air data system.

SUMMARY

In one example, an acoustic air data sensing system includes an acoustic transmitter, a plurality of acoustic receivers, a skin friction sensor, and control circuitry. The acoustic transmitter is located to transmit an acoustic signal into airflow about an exterior of a vehicle. Each of the plurality of acoustic receivers is located at a respective angle from a wind angle reference line and a respective distance from the acoustic transmitter to receive the acoustic signal transmitted by the acoustic transmitter. The skin friction sensor is positioned in a boundary layer region of the airflow that interacts with the acoustic transmitter and the plurality of acoustic receivers. The control circuitry is configured to determine respective times of flight of the acoustic signal from the acoustic transmitter to each of the plurality of acoustic receivers. Additionally, the control circuitry determines, using a signal transmitted by the skin friction sensor, a skin friction value indicative of a parameter of the boundary layer region. Using the time of flight values and the skin friction value as inputs to a transformation matrix, the control circuitry is further configured to determine and output one or more of the true airspeed, the relative wind angle, and the speed of sound for operational control of the vehicle.

In another example, a method includes transmitting, by an acoustic transmitter of an acoustic air data sensor located on a vehicle, an acoustic signal into airflow about an exterior of the vehicle. The method further includes receiving the acoustic signal at a plurality of acoustic receivers of the acoustic air data sensor. Each of the plurality of acoustic receivers is located at a respective angle from a wind angle reference line and a respective distance from the acoustic transmitter. The method further includes receiving a skin friction signal from a skin friction sensor positioned in a boundary layer region of the airflow that interacts with the acoustic transmitter and acoustic receivers. The method further includes determining respective times of flight of the acoustic signal from the acoustic transmitter to each of the plurality of acoustic receivers. Additionally, the method determines, using a signal received from a skin friction sensor, a skin friction value indicative of a parameter of the boundary layer. The method further includes determining, using a transformation matrix, one or more of true airspeed of the airflow, the relative wind angle of the airflow, and the speed of sound in the airflow based on the time of flight values and the skin friction value, and outputting one or more of the true airspeed, the relative wind angle, and the speed of sound for operational control of the vehicle.

DETAILED DESCRIPTION

As described herein, an acoustic air data sensing system includes a skin friction sensor combined with acoustic receivers that are located at various known distances and angles from an acoustic transmitter. The acoustic transmitter produces an acoustic signal that is influenced by airflow about the exterior of a vehicle as the signal propagates to the acoustic receivers. The boundary layer effects on sound propagation speed can be corrected using a measured skin friction value, and the resulting sound propagation speeds between the transmitter and the receivers are used to generate air data parameters (e.g., true airspeed, relative wind angle, and speed of sound). As such, an acoustic air data sensor implementing techniques of this disclosure can effectively produce air data parameters with greater accuracy than acoustic air data sensing systems that do not incorporate skin friction measurements. Accordingly, air data parameters produced in this manner provide improved operational control of the vehicle without requiring direct pressure measurements or angular rotation of a vane within the oncoming airflow.

Figure 1:
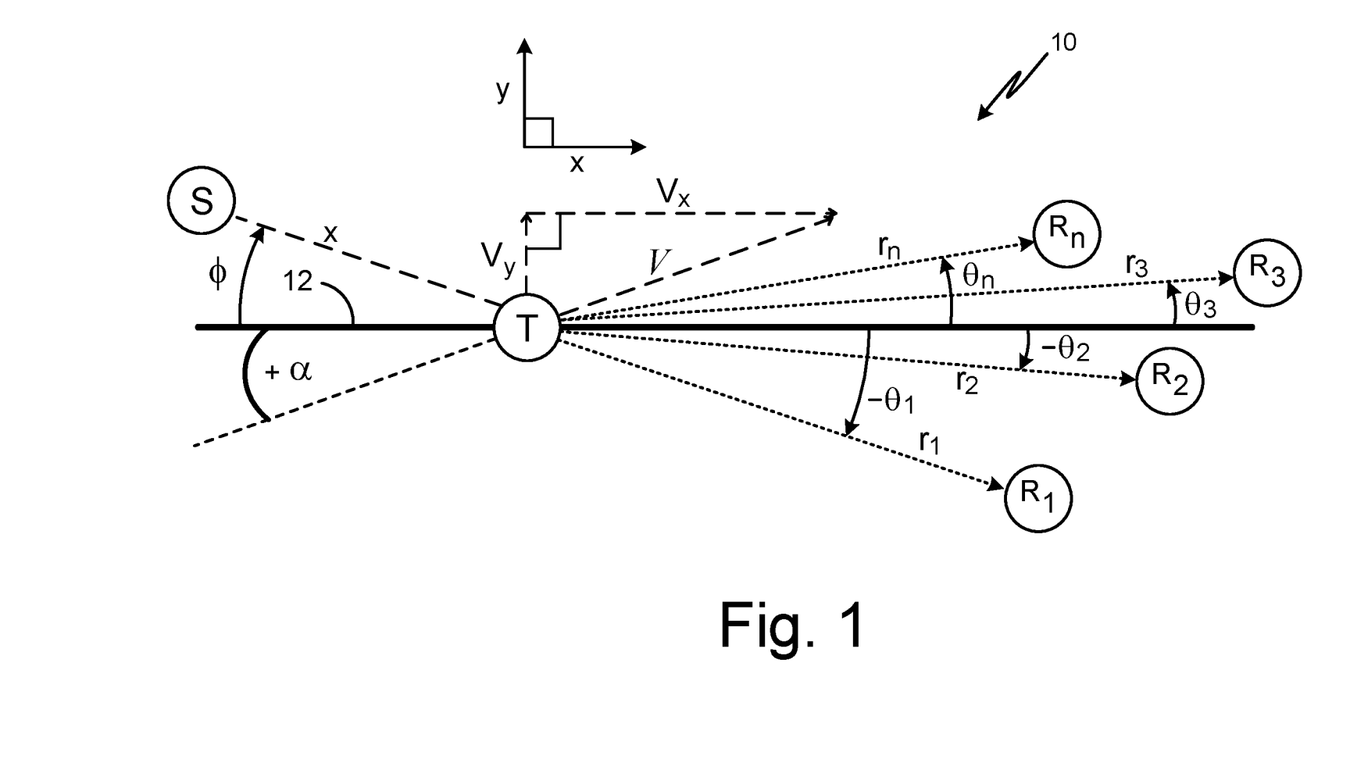
FIG. 1 is a top-down view of an acoustic air data sensing system disclosed herein.

FIG. 1 is a top-down view of acoustic air data sensing system 10 including acoustic transmitter T, acoustic receivers $R_1$, $R_2$, $R_3$, and $R_n$, and skin friction sensor S. Acoustic air data sensing system 10 can be mounted on and/or otherwise incorporated into an exterior of a vehicle, such that an acoustic signal transmitted by transmitter T is influenced by airflow over the exterior of the vehicle during propagation of the acoustic signal between transmitter T and each of receivers $R_1$, $R_2$, $R_3$, and $R_n$. While the examples provided herein are described with respect to acoustic air data sensing system 10 mounted on or otherwise incorporated into an aircraft, it should be understood that the techniques of this disclosure are applicable to any vehicle for which air data parameters are to be generated, e.g., operational control of the vehicle. Examples of such vehicles to which acoustic air data sensing system 10 can be mounted on and/or incorporated into can include, e.g., air vehicles (e.g., aircraft, unmanned aerial vehicles, rotorcraft, drones, missiles, or other air vehicles), ground vehicles (e.g., automobiles, trains, rocket sleds, or other ground vehicles), or any other vehicle for which air data parameters, such as true airspeed, relative wind angle, and speed of sound, are to be generated for operational control of the vehicle.

In some examples, acoustic air data sensing system 10 is incorporated into a mounting plate or other structure configured to be flush-mounted with the exterior of the aircraft, such that edges of the mounting plate and the acoustic transmitter and receivers are aligned with (i.e., flush with) the exterior surface of the aircraft. Mounting of acoustic air data sensing system 10 flush with the exterior surface of the aircraft can reduce or eliminate aerodynamic and acoustic effects caused by the interface of the oncoming airflow with the mounting plate or the acoustic transmitter or receivers themselves. In other examples, any one or more of acoustic transmitter T and receivers $R_1$, $R_2$, $R_3$, and $R_n$ can be integrated into the exterior of the aircraft skin (e.g., and flush with the aircraft exterior skin) without the use of a mounting plate. In yet other examples, the mounting plate and/or the acoustic transmitter T and receivers $R_1$, $R_2$, $R_3$, and $R_n$ of acoustic air data sensing system 10 can be mounted on the exterior of the aircraft such that edges of the mounting plate or any one or more of transmitter T and receivers $R_1$, $R_2$, $R_3$, and $R_n$ are not flush with the exterior of the aircraft. In such examples, aerodynamic and/or acoustic effects of the non-flush interface of the mounting plate, transmitter T, and/or receivers $R_1$, $R_2$, $R_3$, and $R_n$ can be characterized (e.g., in a wind tunnel) and compensated for during the air data parameter computations.

Acoustic transmitter T can be a piezoelectric speaker, a cone speaker, a micro-electro-mechanical systems (MEMS) speaker, or other electric-to-acoustic transducer. Acoustic receivers $R_1$, $R_2$, $R_3$, and $R_n$ can be microphones including MEMS microphones, condenser microphones, or other acoustic-to-electric transducers. While the example of FIG. 1 illustrates four separate receivers (i.e., $R_1$, $R_2$, $R_3$, and $R_n$), it should be understood that the reference "n" represents an arbitrary number, such that acoustic air data sensing system 10 can include any number of acoustic receivers $R_1$-$R_n$.

As illustrated in FIG. 1, each of acoustic receivers $R_1$, $R_2$, $R_3$, and $R_n$ is located at a respective radial distance $r_1$, $r_2$, $r_3$, and $r_n$ from transmitter T. That is, acoustic receiver $R_1$ is located at radial distance $r_1$ from transmitter T, acoustic receiver $R_2$ is located at radial distance $r_2$ from transmitter T, acoustic receiver $R_3$ is located at radial distance $r_3$ from transmitter T, and acoustic receiver $R_n$ is located at radial distance $r_n$ from transmitter T. The radial distances $r_1$, $r_2$, $r_3$, and $r_n$ can be the same or different distances.

Each of acoustic receivers $R_1$, $R_2$, $R_3$, and $R_n$ is located at a respective angle $\theta_1$, $\theta_2$, $\theta_3$, and $\theta_n$ with respect to wind angle reference line 12. That is, acoustic receiver $R_1$ is located at angle $-\theta_1$ (the negative indicating a directional component with respect to wind angle reference line 12), acoustic receiver $R_2$ is located at angle $-\theta_2$ with respect to wind angle reference line 12, acoustic receiver $R_3$ is located at angle $\theta_3$ with respect to wind angle reference line 12, and acoustic receiver $R_n$ is located at angle $\theta_n$ with respect to wind angle reference line 12. In some examples, each of acoustic receivers $R_1$, $R_2$, $R_3$, and $R_n$ is located at a different angle with respect to wind angle reference line 12. In other examples, any two or more of acoustic receivers $R_1$, $R_2$, $R_3$, and $R_n$ can be located at a same angle, but at different radial distances from transmitter T.

Wind angle reference line 12 is a reference line of the aircraft corresponding to an angle of attack or an angle of sideslip of the aircraft upon which acoustic air data sensing system 10 is mounted. For instance, acoustic air data sensing system 10 can be mounted on an aircraft in a location that enables acoustic air data sensing system 10 to measure the relative wind angle corresponding to angle of attack of the aircraft, such as on a side of the aircraft. In such examples, wind angle reference line 12 is a reference line of the aircraft corresponding to aircraft angle of attack, such as a chord of a wing of the aircraft corresponding to a known (i.e., reference) aircraft angle of attack (e.g., zero degrees angle of attack). In other examples, acoustic air data sensing system 10 can be mounted on an aircraft in a location that enables acoustic air data sensing system 10 to measure the relative wind angle corresponding to an angle of sideslip of the aircraft, such as on a top or bottom of the aircraft. In such examples, wind angle reference line 12 is a reference line of the aircraft corresponding to aircraft angle of sideslip, such as a line extending between the nose and the tail of the aircraft corresponding to a known (i.e., reference) aircraft angle of sideslip (e.g., zero degrees angle of sideslip).

In some examples, multiple acoustic air data sensors 10 can be mounted on or otherwise incorporated into the aircraft, such as at multiple orientations and/or locations to provide relative wind angle measurements corresponding to multiple wind angle reference lines 12. For instance, in certain examples, a first acoustic air data sensing system 10 can be mounted on the aircraft in a first location (e.g., a side of the aircraft) that enables the first acoustic air data sensing system 10 to measure the relative wind angle corresponding to angle of attack of the aircraft, and a second acoustic air data sensing system 10 can be mounted on the aircraft in a second location (e.g., a top or bottom of the aircraft) that enables the second acoustic air data sensing system 10 to measure the relative wind angle corresponding to angle of sideslip of the aircraft. Accordingly, such multiple acoustic air data sensors 10 can provide air data parameter measurements corresponding to both angle of attack and angle of sideslip for operational control of the aircraft.

As illustrated in FIG. 1, each of acoustic receivers $R_1$, $R_2$, $R_3$, and $R_n$ can be located downstream (e.g., aft) of acoustic transmitter T, though in other examples, any one or more of acoustic receivers $R_1$, $R_2$, $R_3$, and $R_n$ can be located upstream (e.g., forward) of acoustic transmitter T. Locating receivers $R_1$, $R_2$, $R_3$, and $R_n$ downstream of transmitter T, rather than upstream of transmitter T, can help to mitigate airflow boundary layer velocity effects that bend sound waves traveling upstream in the airflow in a direction that is away from the exterior surface of the aircraft (i.e., the mounting surface of acoustic air data sensing system 10). Such bending (i.e., away from the aircraft skin) can attenuate the acoustic signal at the upstream receivers, thereby decreasing the signal-to-noise ratio and causing decreased accuracy of air data parameter computations that are based on the acoustic signal received at the upstream receivers. The same airflow boundary layer velocity effects, however, also cause bending of sound waves traveling downstream in the airflow in a direction that is toward the exterior surface of the aircraft. Such bending (i.e., toward the aircraft skin) can increase the strength of the acoustic signal received at the downstream receivers, thereby increasing the signal-to-noise ratio at the downstream receivers. Additionally, bending of the acoustic signal toward or away from the exterior surface of the aircraft can increase or decrease, respectively, the times of flight detected by the receivers, depending on the receiver's position relative to the transmitter. Accordingly, in certain examples, such as the example of FIG. 1, each of the receivers $R_1$, $R_2$, $R_3$, and $R_n$ can be located downstream (i.e., aft) of transmitter T to alleviate the shadowing effect (i.e., signal attenuation) at upstream receivers that is exacerbated with greater air velocities.

In addition, as illustrated in FIG. 1, receivers $R_1$, $R_2$, $R_3$, and $R_n$ can be located such that no two of acoustic receivers $R_1$, $R_2$, $R_3$, and $R_n$ are directly opposing receivers. That is, receivers $R_1$, $R_2$, $R_3$, and $R_n$ can be located such that no straight line can be drawn through any two of receivers $R_1$, $R_2$, $R_3$, and $R_n$ and transmitter T, with transmitter T located between the two receivers $R_1$, $R_2$, $R_3$, and $R_n$.

Figure 2:
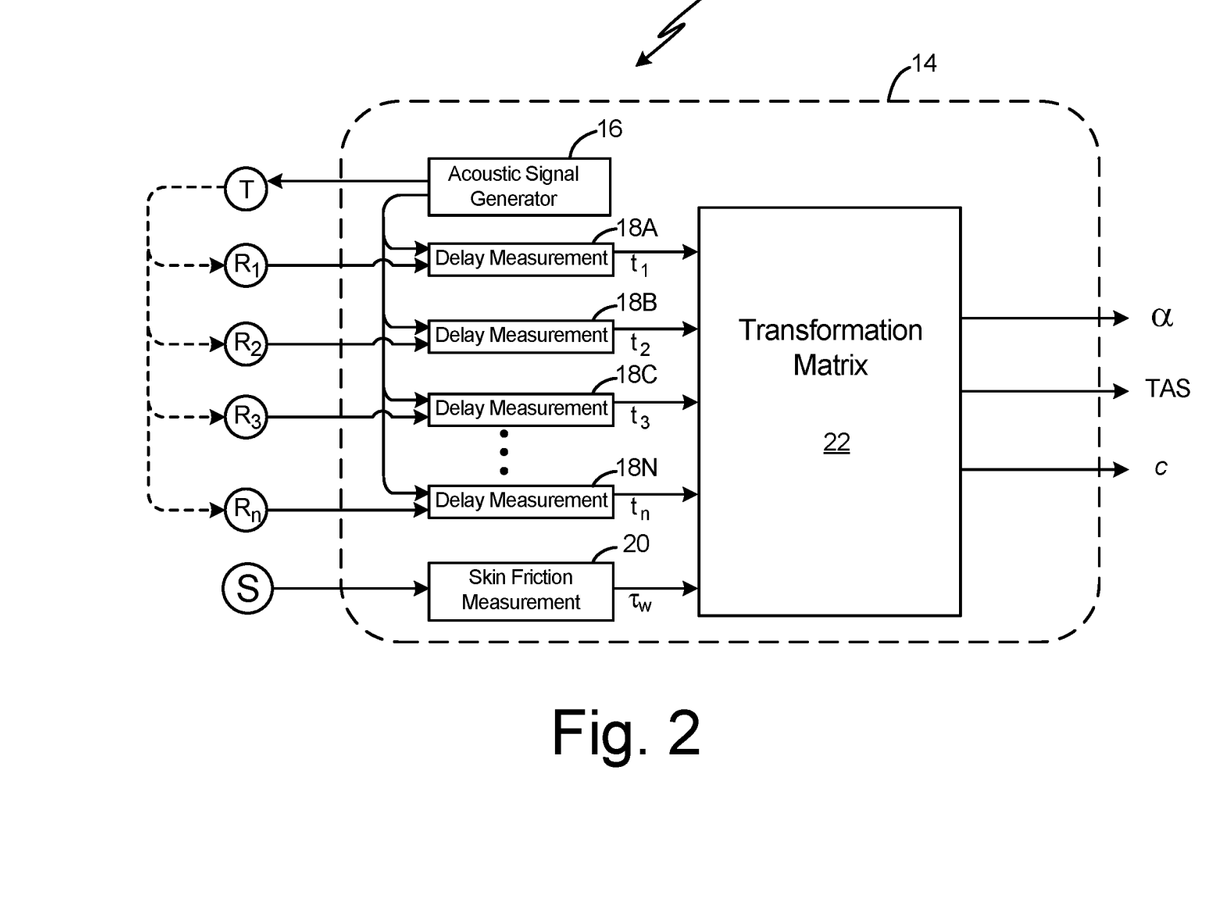
FIG. 2 is a schematic block diagram illustrating further details of the acoustic air data sensing system to produce air data outputs.

Skin friction sensor S is a device adapted to output a signal indicative of the frictional force or drag acting on the exterior surface of the aircraft (or other vehicle) produced by the aircraft moving through airflow about the exterior of the aircraft. While only one skin friction sensor S is shown in FIGS. 1 and 2, air data sensing system 10 can include multiple skin friction sensors S arranged in an array about transmitter T and receivers $R_1$, $R_2$, $R_3$, and $R_n$. Whether one or more skin friction sensors S are employed, the sensor arrangement can be used to characterize a parameter of the boundary layer interacting with transmitter T and/or receivers $R_1$, $R_2$, $R_3$, and $R_n$. In some embodiments, one or more skin friction sensors S are used to characterized a thickness of the boundary layer (or a thickness distribution of the boundary layer), boundary layer thickness δ being directly proportional to freestream velocity $U_o$ (i.e., true total airspeed) and inversely proportional to skin friction $\tau_w$ as indicated by equation 1 below.

$$\tau_w \sim \frac{U_o}{\delta} \qquad \text{(Equation 1)}$$

In order to characterize the boundary layer thickness δ, one or more skin friction sensors S can be located upstream from transmitter T, as shown in FIG. 1, or downstream from transmitter T. Moreover, each skin friction sensors S can be located along wind angle reference line 12 or be positioned at a radial distances x from transmitter T and at an angle φ from wing angle reference line 12.

In some embodiments, skin friction sensor S includes a heated surface mounted flush with the exterior surface of the vehicle. A heat source applies a known fixed thermal heat flux into the heated surface such that, in the absence of moving airflow, the heated surface reaches a steady state surface temperature. The steady state surface temperature is selected such that, in operation, the heated plate is convectively cooled by air (or other fluid) moving across the heated surface. One or more temperature sensors embedded in the heated surface at or near the exterior surface, mounted to a backside or interior side of the heated surface, or both output one or more signals representative of the exterior surface temperature of the heated surface. The temperature change that results from cooling the heated surface is representative of the fluid velocity flowing across the heated surface, and in turn, the skin friction at the heated surface. Temperature signals can be processed locally or remotely by control circuitry to produce an output representative of a skin friction value at the skin friction sensor.

In other embodiments, skin friction can be determined using a micro-electrical-mechanical sensor or MEMS device, which has a measurement surface offset from a strain gauge and joined thereto by one or more mechanical connections (e.g., spar or beam elements). The mechanical connections couple the measurement surface to the strain gauge such that displacement of the measurement surface imparts strain into the strain gauge. The strain gauge outputs a signal indicative of the magnitude of strain. The strain gauge output signal is also proportional to the displacement of the measurement surface, which in turn, is representative of the skin friction applied to the measurement surface by the airflow about the exterior of the aircraft. Accordingly, a MEMS device can be used to directly measure the skin friction applied to the exterior surface of the vehicle and output a signal representative of a skin friction value.

In operation, acoustic air data sensing system 10 experiences airflow as it passes over the aircraft exterior, which is illustrated in the example of FIG. 1 as airflow velocity vector V. The direction of travel of airflow velocity vector V forms relative wind angle α with respect to wind angle reference line 12. The magnitude of airflow velocity vector V represents the speed of the airflow (or true airspeed) of the airflow about the aircraft exterior.

Acoustic transmitter T emits an acoustic signal into the airflow about the aircraft exterior. The acoustic signal, affected by the airflow velocity vector V and boundary layer thickness, propagates to each of acoustic receivers $R_1$, $R_2$, $R_3$, and $R_n$, which receive the acoustic signal at varying times. As is further described below, acoustic air data sensing system 10 includes control circuitry that determines times of flight of the emitted acoustic signal to each of receivers $R_1$, $R_2$, $R_3$, and $R_n$ based on the time at which the acoustic signal is transmitted from acoustic transmitter T and the various times at which the acoustic signal is received at the receivers $R_1$, $R_2$, $R_3$, and $R_n$. Additionally, the control circuitry determines a skin friction value from one or more skin friction signals received from one or more skin friction sensors S.

As is further described below, acoustic air data sensing system 10 determines air data parameter outputs, including one or more of true airspeed (TAS) of the airflow, the relative wind angle of the airflow (i.e., α), and the speed of sound (i.e., c), based on the determined times of flight of the emitted acoustic signal to each of receivers $R_1$, $R_2$, $R_3$, and $R_n$ and the measured skin friction value or values $\tau_w$. The air data parameter outputs are transmitted to one or more consuming systems, such as an aircraft flight management system (FMS), autoflight control system (AFCS), electronic flight instrument system (EFIS), or other consuming systems, which use the received air data parameter outputs for operational control of the aircraft.

Accordingly, acoustic air data sensing system 10, implementing techniques of this disclosure, determines aircraft air data parameters, such as true airspeed (TAS), speed of sound, angle of attack and/or angle of sideslip based on propagation of an emitted acoustic signal that is received at acoustic receivers $R_1$, $R_2$, $R_3$, and $R_n$ and one or more measured skin friction values $\tau_w$. The acoustic receivers $R_1$, $R_2$, $R_3$, and $R_n$, in some examples, are each located aft of transmitter T, thereby enabling accurate measurements and air data parameter calculations even at relatively high wind velocities, such as velocities above Mach 0.2. The acoustic air data sensing system 10 described herein can therefore provide air data parameter outputs that are usable for operational control of the aircraft and which are determined based on measurements that may be less susceptible to common failure modes of traditional pneumatic and rotating vane sensors, such as ice accumulation and/or the buildup of particulates such as volcanic ash.

FIG. 2 is a schematic block diagram illustrating further details of acoustic air data sensing system 10 to produce air data outputs. As illustrated in FIG. 2, acoustic air data sensing system 10 further includes control circuitry 14. Control circuitry 14 includes acoustic signal generator 16, delay measurement circuitry 18A-18N, skin friction measurement circuitry 20, and transformation matrix 22.

While the example of FIG. 2 illustrates and describes control circuitry 14 as including various circuit components, it should be understood that in some examples, control circuitry 14 and/or any one or more components of control circuitry 14 can be implemented in hardware, software, or combinations of hardware and software. For instance, control circuitry 14 can take the form of and/or include one or more processors and computer-readable memory encoded with instructions that, when executed by the one or more processors, cause acoustic air data sensing system 10 to operate in accordance with techniques described herein.

Examples of the one or more processors can include any one or more of a microprocessor, a digital signal processor (DSP), an application specific integrated circuit (ASIC), a field-programmable gate array (FPGA), or other equivalent discrete or integrated logic circuitry. Computer-readable memory of control circuitry 14 can be configured to store information within control circuitry 14 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of control circuitry 14 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories.

As illustrated in FIG. 2, acoustic signal generator 16 provides an electrical control signal to transmitter T representing a waveform of an acoustic signal to be transmitted by transmitter T. Acoustic signal generator 16 also provides the electrical signal representing the waveform of the acoustic signal to be transmitted as a reference signal to delay measurement circuitry 18A-18N. The waveform can take the form of an acoustic pulse, an oscillating acoustic signal, a broadband acoustic signal, a random source acoustic signal, or other form of acoustic signal.

Transmitter T, in response to receiving the electrical control signal from acoustic signal generator 16, transmits the acoustic signal into the airflow about the aircraft exterior. The acoustic signal propagates through the airflow about the aircraft exterior and is received by each of acoustic receivers $R_1$, $R_2$, $R_3$, and $R_n$, as is schematically illustrated by dashed lines in the example of FIG. 2.

Acoustic receivers $R_1$, $R_2$, $R_3$, and $R_n$ receive the acoustic signal at varying times. Each of receivers $R_1$, $R_2$, $R_3$, and $R_n$ provides an electrical signal to a corresponding one of delay measurement circuitry 18A-18N, the electrical signal representing the waveform of the received acoustic signal. Each of delay measurement circuitry 18A-18N determines the time delay representing the time of flight of the acoustic signal emitted by transmitter T to the respective one of receivers $R_1$, $R_2$, $R_3$, and $R_n$, and outputs the respective time delay to transformation matrix 22. For instance, as illustrated in FIG. 2, delay measurement circuitry 18A outputs time of flight (or time delay) $t_1$ to transformation matrix 22, the time of flight $t_1$ representing the time of flight of the acoustic signal from transmitter T to acoustic receiver $R_1$. Delay measurement circuitry 18B outputs time of flight $t_2$ to transformation matrix 22, the time of flight $t_2$ representing the time of flight of the acoustic signal from transmitter T to acoustic receiver $R_2$. Delay measurement circuitry 18C outputs time of flight $t_3$ to transformation matrix 22, the time of flight $t_3$ representing the time of flight of the acoustic signal from transmitter T to acoustic receiver $R_3$. Delay measurement circuitry 18N outputs time of flight $t_n$ to transformation matrix 22, the time of flight $t_n$ representing the time of flight of the acoustic signal from transmitter T to acoustic receiver $R_n$.

Delay measurement circuitry 18A-18N can determine the times of flight $t_1$, $t_2$, $t_3$, and $t_n$ as the difference in time between the reference signal received from acoustic signal generator 16 and the receiver signal received from a respective one of acoustic receivers $R_1$, $R_2$, $R_3$, and $R_n$, such as a difference in time between time-valued locations of one or more identified features of the signals, such as one or more of a maximum, a minimum, a zero-crossing, or other identified features. In some examples, each of delay measurement circuitry 18A-18N determines the time of flight using cross-correlation operations to determine a correlation signal between the reference signal received from acoustic signal generator 16 and the receiver signal received from the corresponding one of receivers $R_1$, $R_2$, $R_3$, and $R_n$. In such examples, delay measurement circuitry 18A-18N can identify the respective time of flight as the time shift corresponding to a maximum of the correlation signal generated by the cross-correlation operations.

In some examples, delay measurement circuitry 18A-18N determines that a receiver signal from the corresponding one of receivers $R_1$, $R_2$, $R_3$, and $R_n$ is not received or is otherwise unsuitable for use with the air data parameter output computations, such as when a failure mode of one of receivers $R_1$, $R_2$, $R_3$, and $R_n$ prevents the corresponding receiver from receiving the acoustic signal emitted by transmitter T, or when an acoustic noise burst or other acoustic signal interferes with the acoustic signal emitted by transmitter T. For instance, delay measurement circuitry 18A-18N can determine that the receiver signal is not received or is otherwise unusable in response to determining that a time delay between the receiver signal and the reference signal is greater than (or equal to) a threshold time delay and/or a maximum of the correlation signal between the receiver signal and the reference signal is less than (or equal to) a threshold correlation value. In such examples, delay measurement circuitry 18A-18N can output, as the corresponding one of time of flight $t_1$, $t_2$, $t_3$, and $t_n$, a value of zero or other defined value indicating that the receiver signal was not received or is otherwise unusable for air data output computations.

Skin friction measurement circuitry 20 can determine one or more skin friction values $\tau_w$ based on respective signals received from one or more skin friction sensors S (e.g., signals indicative a strain induced by a measurement surface coupled to a strain gauge and/or temperature signals indicative of a surface temperature of a heated surface of the sensor). In some examples, a single skin friction sensor S is positioned at a location within the boundary layer of the airflow that is representative of the boundary layer in a region that interacts with transmitter T and receivers $R_1$, $R_2$, $R_3$, and $R_n$. In other examples, multiple skin friction sensors S can be arranged in an array, respective signals from the skin friction sensors being used to produce an average skin friction value by skin friction measurement circuitry 20.

As illustrated in FIG. 2, transformation matrix 22 receives times of flight $t_1$-$t_n$ from delay measurement circuitry 18A-18N and skin friction value $\tau_w$ from skin friction measurement circuitry 20. Transformation matrix 22 determines one or more of true airspeed $U_o$, relative wind angle $\alpha$, and speed of sound c based on skin friction value $\tau_w$ and time of flight values $t_1$, $t_2$, $t_3$, and $t_n$. In some embodiments, transformation matrix 22 can take the form of a plurality of 3×n matrices, the reference "n" representing an arbitrary number corresponding to the number of receivers $R_1$-$R_n$. In this form, each 3×n matrix is defined at one of a set of predetermined skin friction values. For a set of predetermined skin friction values $\tau_1$, $\tau_2$, . . . , and $\tau_p$, the reference "p" representing an arbitrary number, such the set of predetermined skin friction values $\tau_1$, $\tau_2$, . . . , and $\tau_p$ can include any number of skin friction values. Transformation matrix 22 can be defined by the following plurality of matrices.

$$\text{For } \tau_1, \begin{bmatrix} A_{11} & A_{12} & \ldots & A_{1n} \\ A_{21} & A_{22} & \ldots & A_{2n} \\ A_{31} & A_{32} & \ldots & A_{3n} \end{bmatrix}$$

$$\text{For } \tau_2, \begin{bmatrix} B_{11} & B_{12} & \ldots & B_{1n} \\ B_{21} & B_{22} & \ldots & B_{2n} \\ B_{31} & B_{32} & \ldots & B_{3n} \end{bmatrix}$$

$$\vdots \qquad \vdots$$

$$\text{For } \tau_p, \begin{bmatrix} C_{11} & C_{12} & \ldots & C_{1n} \\ C_{21} & C_{22} & \ldots & C_{2n} \\ C_{31} & C_{32} & \ldots & C_{3n} \end{bmatrix}$$

Using this form, determining true airspeed $U_o$, relative wind angle $\alpha$, and speed of sound c at one of the preselected skin friction values $\tau_1$, $\tau_2$, . . . , and $\tau_p$ can be determined using the equation below, substituting the transformation matrix corresponding to the measured skin friction into the equation. For example, for a measured skin friction equal to $\tau_1$, true airspeed $U_o$, relative wind angle $\alpha$, and speed of sound c can be determined according to equation 2.

$$\begin{bmatrix} A_{11} & A_{12} & \ldots & A_{1n} \\ A_{21} & A_{22} & \ldots & A_{2n} \\ A_{31} & A_{32} & \ldots & A_{3n} \end{bmatrix} \cdot \begin{bmatrix} t_1 \\ t_2 \\ \vdots \\ t_n \end{bmatrix} = \begin{bmatrix} U_o \\ \alpha \\ c \end{bmatrix} \quad \text{(Equation 2)}$$

For intermediate values of skin friction, true airspeed $U_o$, relative wind angle $\alpha$, and speed of sound c can be determined using an interpolation routine. As a first step in the interpolation routine, measured skin friction $\tau_w$ is compared with the set of predetermined skin friction values $\tau_1$, $\tau_2$, and $\tau_p$. For instance, measured skin fiction value $\tau_w$ could be equal to intermediate skin friction value $\tau_o$, which is greater than skin friction value $\tau_1$ and less than skin friction value $\tau_2$. In this circumstance, skin friction values $\tau_1$ and $\tau_2$ are sequential values in the set of skin friction values $\tau_1$, $\tau_2$, and $\tau_p$ that define a lower limit and an upper limit of the set, respectively, and skin friction values $\tau_1$, intermediate skin friction value $\tau_o$, and skin friction value and $\tau_2$ also form a series of sequential skin friction values. Next, the upper and lower limits of true airspeed $U_{o,upper}$ and $U_{o,lower}$, relative wind angle $\alpha_{upper}$ and $\alpha_{lower}$, and speed of sound $c_{upper}$ and $c_{lower}$ are determined at the upper and lower skin friction limits, respectively, according to equations 3 and 4 below.

$$\begin{bmatrix} A_{11} & A_{12} & \ldots & A_{1n} \\ A_{21} & A_{22} & \ldots & A_{2n} \\ A_{31} & A_{32} & \ldots & A_{3n} \end{bmatrix} \cdot \begin{bmatrix} t_1 \\ t_2 \\ \vdots \\ t_n \end{bmatrix} = \begin{bmatrix} U_{o,lower} \\ \alpha_{lower} \\ c_{lower} \end{bmatrix} \quad \text{(Equation 3)}$$

$$\begin{bmatrix} B_{11} & B_{12} & \ldots & B_{1n} \\ B_{21} & B_{22} & \ldots & B_{2n} \\ B_{31} & B_{32} & \ldots & B_{3n} \end{bmatrix} \cdot \begin{bmatrix} t_1 \\ t_2 \\ \vdots \\ t_n \end{bmatrix} = \begin{bmatrix} U_{o,upper} \\ \alpha_{upper} \\ c_{lower} \end{bmatrix} \quad \text{(Equation 4)}$$

Subsequently, true airspeed $U_o$, relative wind angle $\alpha$, and speed of sound c can be determined at intermediate skin friction value $\tau_o$ by interpolating based on the upper and lower limits of true airspeed, the upper and lower limits of relative wind angle, and the upper and lower limits of speed of sound. For example, true airspeed $U_o$, relative wind angle $\alpha$, and speed of sound c at intermediate skin friction value $\tau_o$ can be linearly interpolated according to equations 5, 6, and 7 below.

$$U_o(\tau_o) = U_{o,lower} + (\tau_o - \tau_1)\left(\frac{U_{o,upper} - U_{o,lower}}{\tau_2 - \tau_1}\right) \quad \text{(Equation 5)}$$

$$\alpha(\tau_o) = \alpha_{lower} + (\tau_o - \tau_1)\left(\frac{\alpha_{upper} - \alpha_{lower}}{\tau_2 - \tau_1}\right) \quad \text{(Equation 6)}$$

$$c(\tau_o) = c_{lower} + (\tau_o - \tau_1)\left(\frac{c_{upper} - c_{lower}}{\tau_2 - \tau_1}\right) \quad \text{(Equation 7)}$$

In other embodiments, each coefficient of transformation matrix 22 can be defined as a function of skin friction, condensing the plurality of transformation matrices into a single matrix. Defining coefficient curve fit equations for each coefficient of the plurality of transformation matrices produces a single matrix having coefficients as a function of skin friction. In abbreviated form, transformation matrix 22 can be defined according to the matrix below.

$$\begin{bmatrix} A(\tau_w)_{11} & A(\tau_w)_{12} & \cdots & A(\tau_w)_{1n} \\ A(\tau_w)_{21} & A(\tau_w)_{22} & \cdots & A(\tau_w)_{2n} \\ A(\tau_w)_{31} & A(\tau_w)_{32} & \cdots & A(\tau_w)_{3n} \end{bmatrix}$$

Accordingly, true airspeed $U_o$, relative wind angle $\alpha$, and speed of sound c can be determining using equation 8 below.

$$\begin{bmatrix} A(\tau_w)_{11} & A(\tau_w)_{12} & \cdots & A(\tau_w)_{1n} \\ A(\tau_w)_{21} & A(\tau_w)_{22} & \cdots & A(\tau_w)_{2n} \\ A(\tau_w)_{31} & A(\tau_w)_{32} & \cdots & A(\tau_w)_{3n} \end{bmatrix} \cdot \begin{bmatrix} t_1 \\ t_2 \\ \vdots \\ t_n \end{bmatrix} = \begin{bmatrix} U_o \\ \alpha \\ c \end{bmatrix} \quad \text{(Equation 8)}$$

The matrix coefficients A, B, and C for the plurality of transformation matrices 22 can be determined using a test routine performed in a wind tunnel or during operational tests of the vehicle (i.e., test flights) whereby data air sensing system 10 is operated at known true airspeeds (TAS), relative wind angles, speeds of sound, and skin friction values, each combination of true airspeeds (TAS), relative wind angle, speed of sound, and skin friction values defining an operational condition for the aircraft. Defining the operational envelop of the aircraft, or other vehicle, includes defining a set of operational conditions in which values of true airspeed (TAS), relative wind angle, speed of sound, and skin friction are varied over respective ranges representative of the operational envelop of the aircraft. For each operational condition, a time of flight vector composed of time of flight values $t_1$, $t_2$, $t_3$, and $t_n$ is recorded and stored. Using the set of recorded time of flight vectors and known operational conditions, a system of equations can be solved to define transformation matrix 22 for a given skin friction value. Repeating the process for a set of skin friction values yields a plurality of transformation matrices 22, each transformation matrix 22 converting the time of flight vector to a true airspeed vector defined by true airspeed $U_o$, relative wind angle $\alpha$, and speed of sound c for a given skin friction value.

Subsequently, the plurality of transformation matrices 22 can be condensed into a single transformation matrix 22 by defining a polynomial fit equation for each matrix coefficient. For example, for corresponding matrix coefficients $A_{11}$, $B_{11}$, and $C_{11}$, coefficient fit equation $A(\tau_w)_{11}$ can be defined using regression techniques. Repeating this process for each matrix coefficient produces the transformation matrix of equation 8.

Discussion of Possible Embodiments

The following are non-exclusive descriptions of possible embodiments of the present invention.

An acoustic air data sensing system according to an exemplary embodiment of this disclosure, among other possible things, includes an acoustic transmitter, a plurality of acoustic receivers, a skin friction sensor, and control circuitry. The transmitter is located on a vehicle and configured to transmit an acoustic signal into airflow about an exterior of the vehicle. Each of the plurality of receivers is located at a respective angle from a wind angle reference line and a respective distance from the acoustic transmitter to receive the acoustic signal transmitted by the acoustic transmitter. The skin friction sensor is positioned in a boundary layer region of the airflow that interacts with the acoustic transmitter and the plurality of acoustic receivers.

The control circuitry is configured to determine respective times of flight of the acoustic signal from the acoustic transmitter to each of the plurality of acoustic receivers, determine a measured skin friction value indicative of a parameter of the boundary layer region, determine at least one of a true airspeed of the airflow, a relative wind angle of the airflow, and the speed of sound of the airflow based on the respective times of flight of the acoustic signal and the measured skin friction value, and output one or more of the true airspeed of the airflow, the relative wind angle of the airflow, and the speed of sound in the airflow.

The acoustic air data sensing system of the preceding paragraph can optionally include, additionally and/or alternatively, any one or more of the following features, configurations and/or additional components:

A further embodiment of the foregoing acoustic air data sensing system, wherein the control circuitry can be configured to determine at least one of the true airspeed of the airflow, the relative wind angle of the airflow, and the speed of sound in the airflow based on a plurality of transformation matrices, each transformation matrix of the plurality of transformation matrices includes a plurality of values that defines, for one of a set of preselected skin friction values, at least one of the true airspeed of the airflow, the relative wind angle of the airflow, and the speed of sound in the airflow as functions of respective times of flight of the acoustic signals.

A further embodiment of any of the foregoing acoustic air data sensing systems, wherein the control circuitry is configured to determine, based on the relative wind angle, an angle of attack or an angle of sideslip of the vehicle.

A further embodiment of any of the foregoing acoustic air data sensing systems, wherein each transformation matrix of the plurality of transformation matrices can take the form of:

$$\begin{bmatrix} A_{11} & A_{12} & \cdots & A_{1n} \\ A_{21} & A_{22} & \cdots & A_{2n} \\ A_{31} & A_{32} & \cdots & A_{3n} \end{bmatrix}$$

where $A_{11}$, $A_{12}$ ... $A_{1n}$; $A_{21}$, $A_{22}$ ... $A_{2n}$; and $A_{31}$, $A_{32}$ ... $A_{3n}$ are coefficients of the transformation matrix.

A further embodiment of any of the foregoing acoustic air data sensing systems, wherein the skin friction sensor can include a heated surface having a temperature affected by the boundary layer of airflow about the exterior of the vehicle, and the control circuitry can determine the skin friction value based on the temperature of the heated surface.

A further embodiment of any of the foregoing acoustic air data sensing systems, wherein the skin friction sensor can include a strain gauge and a measurement surface offset from the strain gauge and coupled to the strain gauge. The measurement surface of the skin friction sensor is moveable by airflow about the exterior of the vehicle to induce strain in the strain gauge. The strain gauge produces a signal indicative of skin friction, and the control circuitry determines the skin friction value based on the signal indicative of skin friction outputted by the strain gauge.

A further embodiment of any of the foregoing acoustic air data sensing systems, wherein the coefficients of the transformation matrix can be determined by a test routine using predetermined total airspeed values, relative wind angle values, speed of sound values, and skin friction values.

A further embodiment of any of the foregoing acoustic air data sensing systems, wherein determining at least one of the true airspeed of the airflow, the relative wind angle of the airflow, and the speed of sound in the airflow can include comparing the measured skin friction value to the set of preselected skin friction values.

A further embodiment of any of the foregoing acoustic air data sensing systems, wherein determining at least one of the true airspeed, the relative wind angle of the airflow, and the speed of sound in the airflow can include selecting a series of skin friction values that includes, in sequential order, a lower limit, the measured skin friction value, and an upper limit in which the lower limit and the upper limit are sequential skin friction values of the set of preselected skin friction values.

A further embodiment of any of the foregoing acoustic air data sensing systems, wherein determining at least one of the true airspeed in the airflow, the relative wind angle of the airflow, and the speed of sound in the airflow can include determining, at the lower and upper limits, at least one of the true airspeed of the airflow, the relative wind angle of the airflow, and the speed of sound in the airflow.

A further embodiment of any of the foregoing acoustic air data sensing systems, wherein determining at least one of the true airspeed of the airflow, the relative wind angle of the airflow, and the speed of sound in the airflow can include determining, based on the at least one of the true airspeed, the relative wind angle, and the speed of sound in the airflow determined at the upper and lower limits, at least one of the true airspeed of the airflow, the relative wind angle of the airflow, and the speed of sound in the airflow at the measured skin friction value.

A further embodiment of any of the foregoing acoustic air data sensing systems, wherein one or more of the true airspeed of the airflow, the relative wind angle of the airflow, and the speed of sound in the airflow is outputted for operational control of the vehicle.

A further embodiment of any of the foregoing acoustic air data sensing systems, wherein the measured skin friction value is indicative of a thickness of the boundary layer region.

A further embodiment of any of the foregoing acoustic air data sensing systems, wherein the measured skin friction value is indicative of a thickness distribution of the boundary layer region.

An acoustic air data sensing system according to another exemplary embodiment of this disclosure, among other possible things, includes an acoustic transmitter, a plurality of acoustic receivers, a skin friction sensor, and control circuitry. The transmitter is located on a vehicle and configured to transmit an acoustic signal into airflow about an exterior of the vehicle. Each of the plurality of receivers is located at a respective angle from a wind angle reference line and a respective distance from the acoustic transmitter to receive the acoustic signal transmitted by the acoustic transmitter. The skin friction sensor is positioned in a boundary layer region of the airflow that interacts with the acoustic transmitter and the plurality of acoustic receivers. The control circuitry is configured to determine respective times of flight of the acoustic signal from the acoustic transmitter to each of the plurality of acoustic receivers, determine a measured skin friction value indicative of a parameter of the boundary layer region, determine at least one of a true airspeed of the airflow, a relative wind angle of the airflow, and a speed of sound in the airflow based on the respective times of flight of the acoustic signal and the measured skin friction value, and output one or more of the true airspeed of the airflow, the relative wind angle of the airflow, and the speed of sound in the airflow. The control circuitry is further configured to determine at least one of the true airspeed of the airflow, the relative wind angle of the airflow, and the speed of sound in the airflow using a transformation matrix defined by a plurality of coefficients, each coefficient of the transformation matrix determined as a function of the measured skin friction value.

The acoustic air data sensing system of the preceding paragraph can optionally include, additionally and/or alternatively, any one or more of the following features, configurations and/or additional components:

A further embodiment of the foregoing acoustic air data sensing system, wherein the transformation matrix can take the form of:

$$\begin{bmatrix} A(\tau_w)_{11} & A(\tau_w)_{12} & \cdots & A(\tau_w)_{1n} \\ A(\tau_w)_{21} & A(\tau_w)_{22} & \cdots & A(\tau_w)_{2n} \\ A(\tau_w)_{31} & A(\tau_w)_{32} & \cdots & A(\tau_w)_{3n} \end{bmatrix}$$

where $A(\tau_w)_{11}, A(\tau_w)_{12} \ldots A(\tau_w)_{1n}$; $A(\tau_w)_{21}, A(\tau_w)_{22} \ldots A(\tau_w)_{2n}$; and $A(\tau_w)_{31}, A(\tau_w)_{32} \ldots A(\tau_w)_{3n}$ are coefficients of the transformation matrix defined as a function of skin friction.

A further embodiment of any of the foregoing acoustic air data sensing systems, wherein the true airspeed of the airflow, the relative wind angle of the airflow, and the speed of sound in the airflow can be determined according to the equation:

$$\begin{bmatrix} A(\tau_w)_{11} & A(\tau_w)_{12} & \cdots & A(\tau_w)_{1n} \\ A(\tau_w)_{21} & A(\tau_w)_{22} & \cdots & A(\tau_w)_{2n} \\ A(\tau_w)_{31} & A(\tau_w)_{32} & \cdots & A(\tau_w)_{3n} \end{bmatrix} \cdot \begin{bmatrix} t_1 \\ t_2 \\ \vdots \\ t_n \end{bmatrix} = \begin{bmatrix} U_o \\ \alpha \\ c \end{bmatrix}$$

where $A(\tau_w)_{11} \ldots A(\tau_w)_{1n}$ and $A(\tau_w)_{21} \ldots A(\tau_w)_{2n}$ are coefficients of the transformation matrix, $t_1 \ldots t_n$ are the time of flight values from the transmitter to respective receivers, $U_o$ is true airspeed, $\alpha$ is relative wind angle, and $c$ is the speed of sound.

A further embodiment of any of the foregoing acoustic air data sensing systems, wherein the skin friction sensor can include a heated surface having a temperature affected by the boundary layer of airflow about the exterior of the vehicle, and the control circuitry can determine the skin friction value based on the temperature of the heated surface.

A further embodiment of any of the foregoing acoustic air data sensing systems, wherein the skin friction sensor can include a strain gauge and a measurement surface offset from the strain gauge and coupled to the strain gauge. The measurement surface of the skin friction sensor is moveable by airflow about the exterior of the vehicle to induce strain in the strain gauge. The strain gauge produces a signal indicative of skin friction, and the control circuitry determines the skin friction value based on the signal indicative of skin friction outputted by the strain gauge.

A further embodiment of any of the foregoing acoustic air data sensing systems, wherein the coefficients of the transformation matrix can be determined by a test routine using predetermined total airspeed values, predetermined relative wind angle values, predetermined speed of sound values, and predetermine skin friction values.

A further embodiment of any of the foregoing acoustic air data sensing systems, wherein one or more of the true airspeed of the airflow, the relative wind angle of the airflow, and the speed of sound in the airflow is outputted for operational control of the vehicle.

A further embodiment of any of the foregoing acoustic air data sensing systems, wherein the measured skin friction value is indicative of a thickness of the boundary layer region.

A further embodiment of any of the foregoing acoustic air data sensing systems, wherein the measured skin friction value is indicative of a thickness distribution of the boundary layer region.

A method according to an exemplary embodiment of this disclosure, among other possible things, includes transmitting, by an acoustic transmitter of an acoustic air data sensing system located on a vehicle, an acoustic signal into airflow about an exterior of the vehicle.

The method of the preceding paragraph can optionally include, additionally and/or alternatively, any one or more of the following steps, features, configurations and/or additional components:

A further embodiment of the foregoing method can include receiving the acoustic signal at a plurality of acoustic receivers of the acoustic air data sensor, each of the plurality of acoustic receivers located at a respective angle from a wind angle reference line and a respective distance from the acoustic transmitter.

A further embodiment of any of the foregoing methods can include determining respective times of flight of the acoustic signal from the acoustic transmitter to each of the plurality of acoustic receivers.

A further embodiment of any of the foregoing methods can include receiving a skin friction signal from a skin friction sensor positioned in a boundary layer region of the airflow that interacts with the acoustic transmitter and the plurality of acoustic receivers.

A further embodiment of any of the foregoing methods can include determining, from the skin friction signal, a measured skin friction value indicative of a parameter of the boundary layer region at the acoustic transmitter and the plurality of acoustic receivers.

A further embodiment of any of the foregoing methods, wherein the parameter of the boundary layer region is a thickness of the boundary layer region.

A further embodiment of any of the foregoing methods, wherein the parameter of the boundary layer region is a thickness distribution of the boundary layer region.

A further embodiment of any of the foregoing methods can include determining at least one of a true airspeed of the airflow, a relative wind angle of the airflow, and a speed of sound in the airflow based on the respective times of flight of the acoustic signals and the measured skin friction value.

A further embodiment of any of the foregoing methods can include outputting one or more of the true airspeed of the airflow, the relative wind angle of the airflow, and the speed of sound in the airflow.

A further embodiment of any of the foregoing methods wherein one or more of the true airspeed of the airflow, the relative wind angle of the airflow, and the speed of sound in the airflow is outputted for operational control of the vehicle.

A further embodiment of any of the foregoing methods, wherein at least one of the true airspeed of the airflow, the relative wind angle of the airflow, and the speed of sound in the airflow can be determined based on a plurality of transformation matrices, each transformation matrix of the plurality of transformation matrices includes a plurality of coefficients that defines, for one of a set of preselected skin friction values, at least one of the true airspeed of the airflow, relative wind angle of the airflow, and the speed of sound in the airflow as a function of respective times of flight of the acoustic signals.

A further embodiment of any of the foregoing methods, wherein each transformation matrix of the plurality of the transformation matrices takes the form of:

$$\begin{bmatrix} A_{11} & A_{12} & \ldots & A_{1n} \\ A_{21} & A_{22} & \ldots & A_{2n} \\ A_{31} & A_{32} & \ldots & A_{3n} \end{bmatrix}$$

where $A_{11}, A_{12}, \ldots A_{1n}; A_{21}, A_{22}, \ldots A_{2n};$ and $A_{31}, A_{32}, \ldots A_{3n}$ are coefficients of the transformation matrix.

A further embodiment of any of the foregoing methods, wherein determining the coefficients of each transformation matrix can include defining a plurality of operating conditions, each operating condition defined by a preselected true airspeed of the airflow, a preselected relative wind angle of the airflow, a preselected speed of sound in the airflow, and one of the set of preselected skin friction values.

A further embodiment of any of the foregoing methods, wherein determining the coefficients of each transformation matrix can include operating the air data sensing system at each of the plurality of operating conditions.

A further embodiment of any of the foregoing methods, wherein determining the coefficients of each transformation matrix can include measuring, for each operating condition, respective times of flight of the acoustic signal from the acoustic transmitter to each of the plurality of acoustic receivers.

A further embodiment of any of the foregoing methods, wherein determining the coefficients of each transformation matrix can include determining, for each preselected skin friction value, the transformation matrix defines a relationship among the respective times of flight of the acoustic signals, the true airspeed of the airflow, the relative wind angle of the airflow, and the speed of sound in the airflow.

A further embodiment of any of the foregoing methods, wherein determining the coefficients of each transformation matrix can include determining, for each set of matrix coefficients, a polynomial curve fit describing how each set of matrix coefficients varies with measured skin friction.

A further embodiment of any of the foregoing methods, wherein determining the coefficients of each transformation matrix can include defining the transformation matrix, wherein each coefficient of the transformation matrix is a function of measured skin friction according to respective polynomial curve fits.

A further embodiment of any of the foregoing methods, wherein the transformation matrix can take the form of:

$$\begin{bmatrix} A(\tau_w)_{11} & A(\tau_w)_{12} & \ldots & A(\tau_w)_{1n} \\ A(\tau_w)_{21} & A(\tau_w)_{22} & \ldots & A(\tau_w)_{2n} \\ A(\tau_w)_{31} & A(\tau_w)_{32} & \ldots & A(\tau_w)_{3n} \end{bmatrix}$$

where $A(\tau_w)_{11}, A(\tau_w)_{12}, \ldots A(\tau_w)_{1n}; A(\tau_w)_{21}, A(\tau_w)_{22}, \ldots A(\tau_w)_{2n};$ and $A(\tau_w)_{31}, A(\tau_w)_{32}, \ldots A(\tau_w)_{3n}$ are coefficients of the transformation matrix as a function of skin friction.

A further embodiment of any of the foregoing methods, wherein the true airspeed of the airflow, the relative wind angle of the airflow, and the speed of sound in the airflow can be determined according to the equation:

$$\begin{bmatrix} A(\tau_w)_{11} & A(\tau_w)_{12} & \dots & A(\tau_w)_{1n} \\ A(\tau_w)_{21} & A(\tau_w)_{22} & \dots & A(\tau_w)_{2n} \\ A(\tau_w)_{31} & A(\tau_w)_{32} & \dots & A(\tau_w)_{3n} \end{bmatrix} \cdot \begin{bmatrix} t_1 \\ t_2 \\ \vdots \\ t_n \end{bmatrix} = \begin{bmatrix} U_o \\ \alpha \\ c \end{bmatrix}$$

where $A(\tau_w)_{11}, A(\tau_w)_{12}, \dots A(\tau_w)_{1n}$; $A(\tau_w)_{21}, A(\tau_w)_{22}, \dots A(\tau_w)_{2n}$; and $A(\tau_w)_{31}, A(\tau_w)_{32}, \dots A(\tau_w)_{3n}$ are coefficients of the transformation matrix as a function of skin friction, $t_1, t_2, \dots t_n$ are the time of flight values from the transmitter to respective receivers, $U_o$ is true airspeed, $\alpha$ is relative wind angle, and c is the speed of sound.

A further embodiment of any of the foregoing methods, wherein determining at least one of the true airspeed of the airflow, the relative wind angle of the airflow, and the speed of sound in the airflow can include comparing the measured skin friction value to the set of preselected skin friction values.

A further embodiment of any of the foregoing methods, wherein determining at least one of the true airspeed of the airflow, the relative wind angle of the airflow, and the speed of sound in the airflow can include selecting a series of skin friction values that includes, in sequential order, a lower limit, the measured skin friction value, and an upper limit, wherein the lower limit and the upper limit are sequential skin friction values of the set of preselected skin friction values.

A further embodiment of any of the foregoing methods, wherein determining at least one of the true airspeed of the airflow, the relative wind angle of the airflow, and the speed of sound in the airflow can include determining, at the upper and lower limits of the series of sequential skin friction values, at least one of the true airspeed of the airflow, the relative wind angle of the airflow, and the speed of sound in the airflow.

A further embodiment of any of the foregoing methods, wherein determining at least one of the true airspeed of the airflow, the relative wind angle of the airflow, and the speed of sound in the airflow can include determining, based on at least one of the true airspeed of the airflow, the relative wind angle of the airflow, and the speed of sound in the airflow determined at the upper and lower limits, at least one of the true airspeed, the relative wind angle of the airflow, and the speed of sound at the measured skin friction value.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An acoustic air data sensing system comprising:
   an acoustic transmitter located on a vehicle being configured to transmit an acoustic signal into airflow about an exterior of the vehicle;
   a plurality of acoustic receivers, each of the plurality of acoustic receivers located at a respective angle from a wind angle reference line and a respective distance from the acoustic transmitter being configured to receive the acoustic signal;
   a skin friction sensor positioned in a boundary layer region of the airflow that interacts with the acoustic transmitter and the plurality of acoustic receivers; and
   control circuitry configured to:
     determine respective times of flight of the acoustic signal from the acoustic transmitter to each of the plurality of acoustic receivers;
     determine a measured skin friction value indicative of a parameter of the boundary layer region;
     determine at least one of a true airspeed of the airflow, a relative wind angle of the airflow, and a speed of sound in the airflow based on the respective times of flight of the acoustic signal and the measured skin friction value; and
     output one or more of the true airspeed of the airflow, the relative wind angle of the airflow, and the speed of sound in the airflow.

2. The acoustic air data sensing system of claim 1, wherein the control circuitry is configured to determine at least one of the true airspeed, the relative wind angle of the airflow, and the speed of sound in the airflow based on a plurality of transformation matrices, each transformation matrix of the plurality of transformation matrices includes a plurality of coefficients that defines, for one of a set of preselected skin friction values, at least one of the true airspeed of the airflow, the relative wind angle of the airflow, and the speed of sound in the airflow as a function of the respective times of flight of the acoustic signals.

3. The acoustic air data sensing system of claim 2, wherein determining at least one of the true airspeed of the airflow, the relative wind angle of the airflow, and the speed of sound in the airflow includes:
   comparing the measured skin friction value to the set of preselected skin friction values;
   selecting a series of skin friction values that includes, in sequential order, a lower limit, the measured skin friction value, and an upper limit, wherein the lower limit and the upper limit are sequential skin friction values of the set of preselected skin friction values;
   determining, at the lower and upper limits, at least one of the true airspeed of the airflow, the relative wind angle of the airflow, and the speed of sound in the airflow; and
   determining at least one of the true airspeed of the airflow, the relative wind angle of the airflow, and the speed of sound in the airflow at the measured skin friction value based on the at least one of the true airspeed of the airflow, the relative wind angle of the airflow, and the speed of sound in the airflow determined at the upper and lower limits.

4. The acoustic air data sensing system of claim 1, wherein the control circuitry is configured to:
   determine, based on the relative wind angle, an angle of attack or an angle of sideslip of the vehicle.

5. The acoustic air data sensing system of claim 2, wherein each transformation matrix of the plurality of transformation matrices takes the form of:

$$\begin{bmatrix} A_{11} & A_{12} & \ldots & A_{1n} \\ A_{21} & A_{22} & \ldots & A_{2n} \\ A_{31} & A_{32} & \ldots & A_{3n} \end{bmatrix}$$

where $A_{11}, A_{12}, \ldots A_{1n}; A_{21}, A_{22}, \ldots A_{2n};$ and $A_{31}, A_{32}, \ldots A_{3n}$ are coefficients of the transformation matrix.

6. The acoustic air data sensing system of claim 1, wherein the control circuitry is configured to determine at least one of the true airspeed of the airflow, the relative wind angle of the airflow, and the speed of sound in the airflow using a transformation matrix defined by a plurality of coefficients, each coefficient of the transformation matrix determined as a function of the measured skin friction value.

7. The acoustic air data sensing system of claim 6, wherein the transformation matrix takes the form of:

$$\begin{bmatrix} A(\tau_w)_{11} & A(\tau_w)_{12} & \ldots & A(\tau_w)_{1n} \\ A(\tau_w)_{21} & A(\tau_w)_{22} & \ldots & A(\tau_w)_{2n} \\ A(\tau_w)_{31} & A(\tau_w)_{32} & \ldots & A(\tau_w)_{3n} \end{bmatrix}$$

where $A(\tau_w)_{11}, A(\tau_w)_{12}, \ldots A(\tau_w)_{1n}; A(\tau_w)_{21}, A(\tau_w)_{22}, \ldots A(\tau_w)_{2n};$ and $A(\tau_w)_{31}, A(\tau_w)_{32}, \ldots A(\tau_w)_{3n}$ are coefficients of the transformation matrix as a function of skin friction.

8. The acoustic air data sensing system of claim 7, wherein the true airspeed of the airflow, the relative wind angle of the airflow, and the speed of sound in the airflow are determined according to the equation:

$$\begin{bmatrix} A(\tau_w)_{11} & A(\tau_w)_{12} & \ldots & A(\tau_w)_{1n} \\ A(\tau_w)_{21} & A(\tau_w)_{22} & \ldots & A(\tau_w)_{2n} \\ A(\tau_w)_{31} & A(\tau_w)_{32} & \ldots & A(\tau_w)_{3n} \end{bmatrix} \cdot \begin{bmatrix} t_1 \\ t_2 \\ \vdots \\ t_n \end{bmatrix} = \begin{bmatrix} U_o \\ \alpha \\ c \end{bmatrix}$$

where $A(\tau_w)_{11}, A(\tau_w)_{12}, \ldots A(\tau_w)_{1n}; A(\tau_w)_{21}, A(\tau_w)_{22}, \ldots A(\tau_w)_{2n};$ and $A(\tau_w)_{31}, A(\tau_w)_{32}, \ldots A(\tau_w)_{3n}$ are coefficients of the transformation matrix as a function of skin friction, $t_1, t_2, \ldots t_n$ are the time of flight values from the transmitter to respective receivers, $U_o$ is true airspeed, $\alpha$ is relative wind angle, and c is the speed of sound.

9. The acoustic air data sensing system of claim 2, wherein the coefficients of the transformation matrix are determined by a test routine using predetermined total airspeed values, relative wind angle values, speed of sound values, and skin friction values.

10. The acoustic air data sensing system of claim 1, wherein the skin friction sensor includes a heated surface having a temperature affected by the boundary layer of airflow about the exterior of the vehicle; and wherein the control circuitry determines the skin friction value based on the temperature of the heated surface.

11. The acoustic air data sensing system of claim 1, wherein the skin friction sensor includes a strain gauge and a measurement surface offset from the strain gauge and coupled to the strain gauge, the measurement surface moveable by airflow about the exterior of the vehicle to induce strain in the strain gauge;
wherein the strain gauge produces a signal indicative of skin friction; and
wherein the control circuitry determines the skin friction value based on the signal indicative of skin friction outputted by the strain gauge.

12. A method comprising:
transmitting, by an acoustic transmitter of an acoustic air data sensing system located on a vehicle, an acoustic signal into airflow about an exterior of the vehicle;
receiving the acoustic signal at a plurality of acoustic receivers of the acoustic air data sensor, each of the plurality of acoustic receivers located at a respective angle from a wind angle reference line and a respective distance from the acoustic transmitter;
determining respective times of flight of the acoustic signal from the acoustic transmitter to each of the plurality of acoustic receivers;
receiving a skin friction signal from a skin friction sensor positioned in a boundary layer region of the airflow that interacts with the acoustic transmitter and the plurality of acoustic receivers;
determining, from the skin friction signal, a measured skin friction value indicative of a parameter of a boundary layer region of the airflow at the acoustic transmitter and the plurality of acoustic receivers;
determining at least one of a true airspeed of the airflow, a relative wind angle of the airflow, and a speed of sound in the airflow based on the respective times of flight of the acoustic signals and the measured skin friction value; and
outputting one or more of the true airspeed, the relative wind angle, and the speed of sound.

13. The method of claim 12, wherein at least one of the true airspeed of the airflow, the relative wind angle of the airflow, and the speed of sound in the airflow are determined based on a plurality of transformation matrices, each transformation matrix of the plurality of transformation matrices includes a plurality of coefficients that defines, for one of a set of preselected skin friction values, at least one of the true airspeed of the airflow, the relative wind angle of the airflow, and the speed of sound in the airflow as functions of respective times of flight of the acoustic signals.

14. The method of claim 13, wherein determining at least one of the true airspeed of the airflow, the relative wind angle of the airflow, and the speed of sound in the airflow includes:
comparing the measured skin friction value to the set of preselected skin friction values;
selecting a series of skin friction values that includes, in sequential order, a lower limit, the measured skin friction value, and an upper limit, wherein the lower limit and the upper limit are sequential skin friction values of the set of preselected skin friction values;
determining, at the upper and lower limits of the series of sequential skin friction values, at least one of the true airspeed of the airflow, the relative wind angle of the airflow, and the speed of sound in the airflow; and
determining at least one of the true airspeed of the airflow, the relative wind angle of the airflow, and the speed of sound in the airflow at the measured skin friction value.

15. The method of claim 14,
wherein each transformation matrix of the plurality of the transformation matrices takes the form of:

$$\begin{bmatrix} A_{11} & A_{12} & \ldots & A_{1n} \\ A_{21} & A_{22} & \ldots & A_{2n} \\ A_{31} & A_{32} & \ldots & A_{3n} \end{bmatrix}$$

where $A_{11}, A_{12}, \ldots A_{1n}$; $A_{21}, A_{22}, \ldots A_{2n}$; and $A_{31}, A_{32}, \ldots A_{3n}$ are coefficients of the transformation matrix.

16. The method of claim 12,
wherein the true airspeed of the airflow, the relative wind angle of the airflow, and the speed of sound in the airflow are determined based on a transformation matrix, each value of the transformation matrix determined as a function of the measured skin friction value.

17. The method of claim 16,
wherein the transformation matrix takes the form of:

$$\begin{bmatrix} A(\tau_w)_{11} & A(\tau_w)_{12} & \ldots & A(\tau_w)_{1n} \\ A(\tau_w)_{21} & A(\tau_w)_{22} & \ldots & A(\tau_w)_{2n} \\ A(\tau_w)_{31} & A(\tau_w)_{32} & \ldots & A(\tau_w)_{3n} \end{bmatrix}$$

where $A(\tau_w)_{11}, A(\tau_w)_{12}, \ldots A(\tau_w)_{1n}$; $A(\tau_w)_{21}, A(\tau_w)_{22}, \ldots A(\tau_w)_{2n}$; and $A(\tau_w)_{31}, A(\tau_w)_{32}, \ldots A(\tau_w)_{3n}$ are coefficients of the transformation matrix as a function of skin friction.

18. The method of claim 17,
wherein the true airspeed, the relative wind angle, and the speed of sound are determined according to the equation:

$$\begin{bmatrix} A(\tau_w)_{11} & A(\tau_w)_{12} & \ldots & A(\tau_w)_{1n} \\ A(\tau_w)_{21} & A(\tau_w)_{22} & \ldots & A(\tau_w)_{2n} \\ A(\tau_w)_{31} & A(\tau_w)_{32} & \ldots & A(\tau_w)_{3n} \end{bmatrix} \cdot \begin{bmatrix} t_1 \\ t_2 \\ \vdots \\ t_n \end{bmatrix} = \begin{bmatrix} U_o \\ \alpha \\ c \end{bmatrix}$$

where $A(\tau_w)_{11}, A(\tau_w)_{12}, \ldots A(\tau_w)_{1n}$; $A(\tau_w)_{21}, A(\tau_w)_{22}, \ldots A(\tau_w)_{2n}$; and $A(\tau_w)_{31}, A(\tau_w)_{32}, \ldots A(\tau_w)_{3n}$ are coefficients of the transformation matrix as a function of skin friction, $t_1, t_2, \ldots t_n$ are the time of flight values from the transmitter to respective receivers, $U_o$ is true airspeed, $\alpha$ is relative wind angle, and c is the speed of sound.

19. The method of claim 13,
wherein each transformation matrix of the plurality of transformation matrices is determined by:
defining a plurality of operating conditions, each operating condition defined by a preselected true airspeed of the airflow, a preselected relative wind angle of the airflow, a preselected speed on sound in the airflow, and one of the set of preselected skin friction values;
operating the air data sensing system at each of the plurality of operating conditions;
measuring, for each operating condition, respective times of flight of the acoustic signal from the acoustic transmitter to each of the plurality of acoustic receivers;
determining, for each preselected skin friction value, the transformation matrix that defines a relationship among the respective times of flight of the acoustic signals, the true airspeed, the relative wind angle, and the speed of sound.

20. The method of claim 19,
wherein the plurality of transformation matrices are reduced to a single transformation matrix by:
determining, for each set of matrix coefficients, a polynomial curve fit describing how each set of matrix coefficients varies with measured skin friction; and
defining the transformation matrix, wherein each coefficient of the transformation matrix is a function of measured skin friction according to respective polynomial curve fits.

* * * * *